Patented Feb. 4, 1947

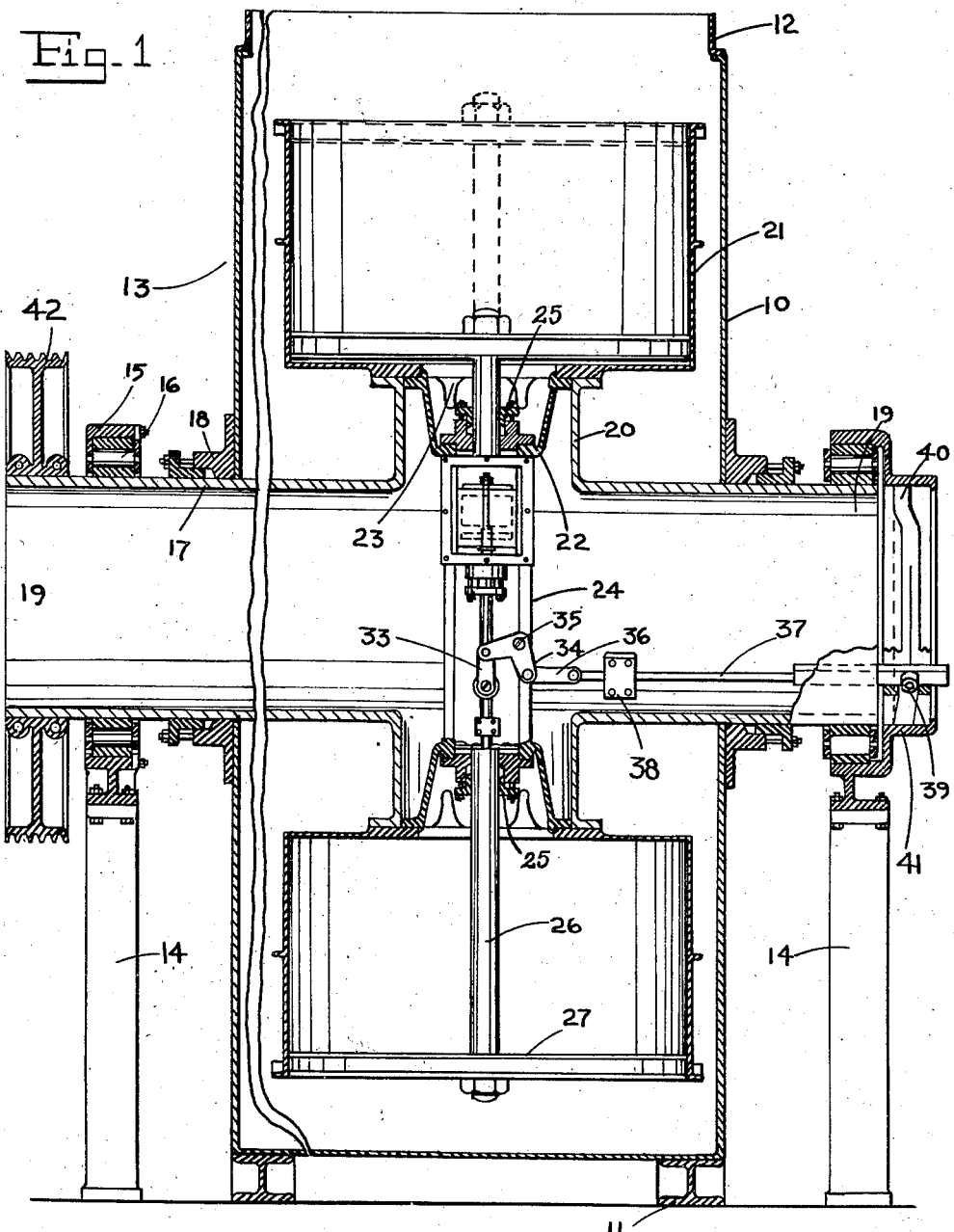

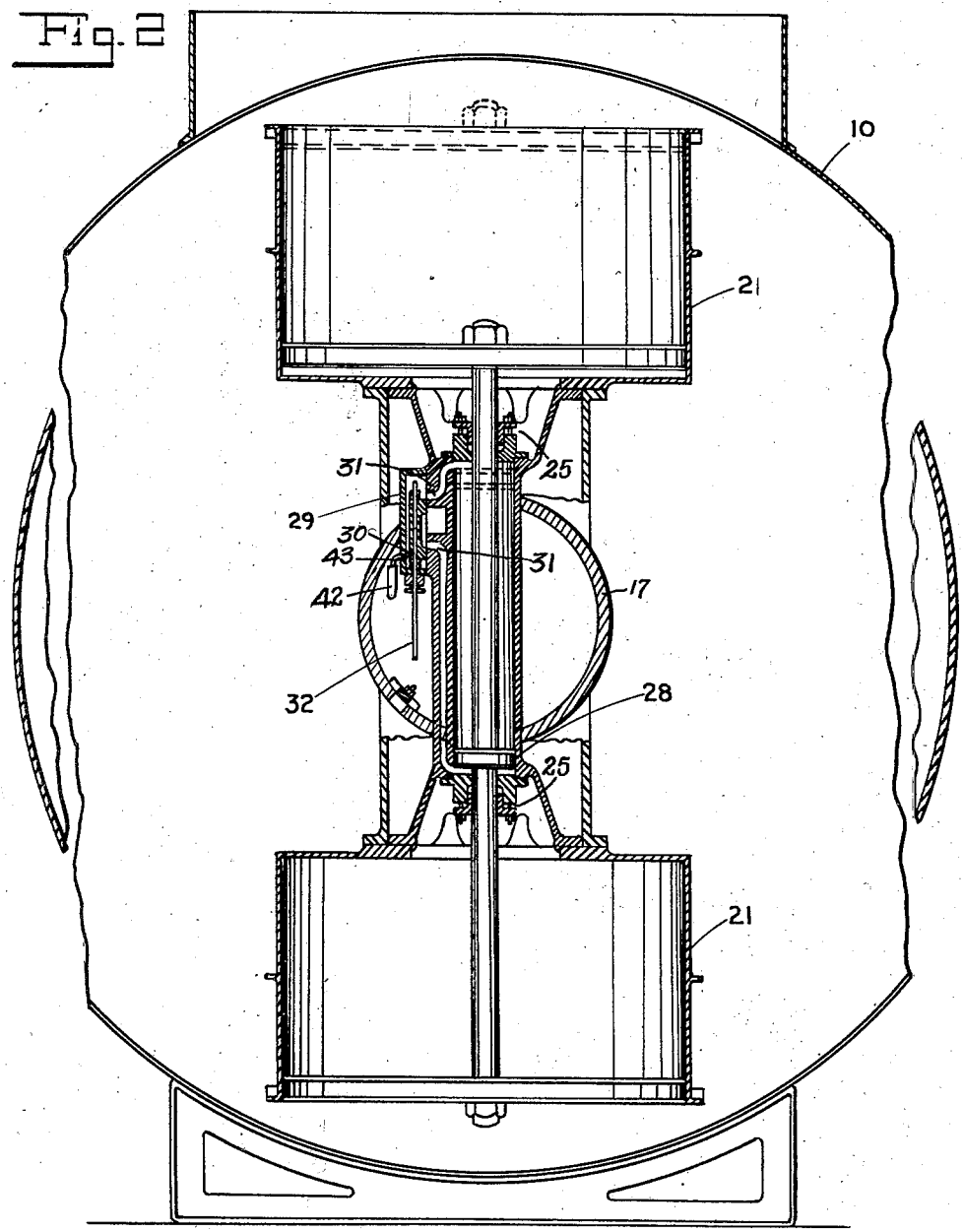

2,415,124

UNITED STATES PATENT OFFICE 2,415,124

ROTARY MOTOR

Antonio Caminiti, Los Angeles, Calif.

Application June 12, 1945, Serial No. 599,104

1 Claim. (Cl. 60—22)

The invention relates to power motor, and more especially to a hydraulic motive power developing apparatus.

The primary object of the invention is the provision of an apparatus of this character, wherein through the use of one or more units thereof motive power can be developed for use in driving a dynamo or other mechanical devices for the operation thereof, the apparatus being of novel construction to assure smoothness of activity and creation of the required driving power.

Another object of the invention is the provision of an apparatus of this character, wherein there is a compactness of assembly of its parts, these being readily accessible and are comparatively few in number, resultant in easy replacement with minimum costs in repairs, and assurance of maximum life.

A further object of the invention is the provision of an apparatus of this character, wherein its operation is had through float activity and its power take-off is rotary driven, the construction being unique in kind, and such apparatus is devoid of springs, weights or other equivalent set-up.

A still further object of the invention is the provision of an apparatus of this character, which is simple in construction, thoroughly reliable and effective in operation, strong, durable, positive in the working thereof, operable at a minimum expense, requiring little or no attention, automatic in its working, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings:

Figure 1 is a vertical longitudinal sectional view through the apparatus constructed in accordance with the invention.

Figure 2 is a view similar to Figure 1 and taken at substantially right angles thereto.

Similar reference characters indicate corresponding parts throughout the several views in the drawings.

Referring to the drawings, the apparatus constituting the present invention comprises one or more single units, involving an upstanding circular shaped tank 10, preferably held secure upon base or supporting racks 11, and this tank at the top thereof is formed with a flanged mouth 12, while spaced from the opposite flat side walls 13 of such tank and rising from the foundation having the racks 11 are vertically disposed bearing frames or uprights 14. The frames or uprights 14 carry circular bearings 15 providing bearing rollers 16 about a tubiform shaft 17 journaled in such bearings.

The shaft 17 is rotatably fitted in the transverse center of the tank 10, and such fittings involve packing glands 18 associated with the opposed flat faces or walls of the said tank. The shaft at opposite ends is open to the atmosphere, which are open at 19, respectively. At diametrically opposite points in line with the vertical center of the tank 10 and integral with the shaft 17 are reverse laterally directed cylindrical branches or extensions 20, which are at right angles to the said shaft. These branches or extensions 20 at their outer ends carry cylindrical float cylinders 21 which are fully open at the outermost ends, while mounted at the centers of the innermost ends of the latter are brackets 22, which partially project into the branches or extensions 20, these being in communication with the cylinders 21 through openings 23 thereto from such branches or extensions.

Between the brackets 22 and joined therewith crosswise through the shaft 17 is an intermediate cylinder 24 with respect to the cylinders 21, the outer ends of the cylinder 24 being equipped with packing glands 25 through which operates a piston stem or rod 26, having at its outer ends piston heads 27 operating within the cylinders 21 so that such heads will alternately move in and out in the opposite ones thereof.

The stem or rod 26 has fixed thereto within the cylinder 24 a piston 28 which concurrently reciprocates therein with the working of the heads 27 within the cylinders 21 in the operation of the apparatus. The cylinder 24 has built externally thereon a valve chest 29 for a compressed air controlling valve 30, which is reciprocatingly mounted therein for regulating the feed of compressed air and the exhaust thereof to and from the cylinder 24 at opposite sides of the piston 28 therein through passages 31 communicating with such cylinder and chest, respectively. The compressed air is delivered to the chest 29 from any suitable source of supply, as for example internally through the shaft 17 by means of the air conduit 42 which is connected to the inlet valve 43 on the chest 29, the air conduit 42 being connected to any suitable source of air supply.

The valve stem 32 externally of the chest 29 has linkage at 33 with a bell-crank 34 rockingly supported by a pivot 35 and linked at 36 to a cam actuated throw arm 37, which is slidably fitted in a guide 38 and carrying a cam roller 39 operating in a cam track 40 in a ring-like cam head piece 41 secured about the shaft 17 and fixed to the frame or upright 14 next thereto. The guide 38 is fitted to the inner surface of the shaft 17 with the arm 37 rotating therewith.

Fixed to the shaft 17 remote from the location of the cam piece 41 is a power take-off pulley 42 which has cooperating therewith a suitable braking means, not shown.

The tank 10 is adapted to be filled with water of sufficient height to envelop the motivating parts within such tank, and this water contains an oil suitable for lubrication.

In the operation of the apparatus constructed in accordance with the invention, compressed air is admitted to the cylinder 24 at one side of the piston 28 for moving the pistons 27 working within the cylinders 21, causing the expulsion of water from one of the cylinders and the intake of air from the shaft 17 into the cylinder, which causes the cylinder to become a float cylinder at the lower area of the tank 10, and by the rising activity of this float cylinder within the water in the latter, supplemented by the water content within the uppermost cylinder 21 in such tank motivates the shaft 17 in a rotary direction, thus developing motive power therethrough for driving a dynamo or other mechanical devices for the operation of the same, the power take-off being had at the pulley 42 of the apparatus.

There can be employed 4, 6, 10, 12 or more float units, depending upon the horsepower required and smoothness of operation of the apparatus.

The cam track 40 with cooperating adjuncts thereto times the operation of the valve within the chest and also reciprocation of the pistons in the cylinders 21 and 24, respectively, to convert the cylinders 21 to floating activity within the water in the tank 10, the floating activity being present when each cylinder is submerged in the water, while opposite cylinder 21 during such cycle of operation is collecting water.

What is claimed is:

An apparatus of the kind described, comprising a water contained tank, a tubiform shaft open to the atmosphere rotatably mounted in the tank, diametrically opposed floating cylinders on the shaft and submerged in the water within the tank, pistons working in the cylinders for water collection and discharge alternately thereby, to and from the tank, and mechanism mounted on said shaft operating on the pistons to effect the collection of water by a descending cylinder and the discharge of water from the ascending cylinder for float activity within the water by the latter cylinder, power operation of the shaft, compressed fluid actuating the said mechanism, a cam head piece mounted about one end of the shaft, a cam track in said head piece and a cam roller traveling in said track for controlling the compressed fluid action and a compressed fluid cylinder having a piston therein cooperating with the pistons of the said cylinders and included in said mechanism.

ANTONIO CAMINITI.

REFERENCES CITED

The following references are of record in the file of this patent:

UNITED STATES PATENTS

| Number | Name | Date |
|---|---|---|
| 2,261,568 | Seawright | Nov. 4, 1941 |
| 115,171 | Cox | May 23, 1871 |

FOREIGN PATENTS

| Number | Country | Date |
|---|---|---|
| 6,829 | British | Mar. 31, 1905 |